United States Patent
Le Mire

[15] 3,669,397
[45] June 13, 1972

[54] VEHICLE SEATS

[72] Inventor: Noel Le Mire, Billancourt, France

[73] Assignee: Regie Nationale Des Usines Renault, Billancourt (Hauts de Seine) France and Automobiles Peugeot, Paris, France

[22] Filed: May 5, 1970

[21] Appl. No.: 34,830

[30] Foreign Application Priority Data

May 8, 1969 France...................................6914745

[52] U.S. Cl...............................248/371, 248/429, 297/216
[51] Int. Cl......................B60r 21/10, B61l 1/00, E01b 7/00
[58] Field of Search..........................248/371, 429; 297/216; 308/3 R

[56] References Cited

UNITED STATES PATENTS 2,959,207  11/1960  Brewster................................297/216
3,524,678  8/1970  De Lavenne..........................297/216

*Primary Examiner*—Ramon S. Britts
*Attorney*—Stevens, Davis, Miller & Mosher

[57] ABSTRACT

A seat for automotive vehicles of the like, rigid with a first section and movable in translation in relation to a second section secured to the floor of the vehicle. The first section carries at least one transverse pivot pin for the seat which lies substantially at the upper level of said movable section and is adapted to move parallel to itself in conjunction with said first section. A member is rigid with said movable section and formed with a zone of lesser strength, the seat is secured at at least one point to said member. The point of securing being shifted longitudinally in relation to the transverse pivot pin of the seat and capable of performing a limited movement of rotation about said transverse pivot pin.

1 Claim, 3 Drawing Figures

PATENTED JUN 13 1972 3,669,397

INVENTOR
NOËL LE MIRE

BY Stevens, Davis, Miller & Mosher
ATTORNEYS

VEHICLE SEATS

This invention relates to improvements in automotive seats or the like and has specific reference to a seat associated with a device adapted to absorb kinetic energy without any subsequent restitution thereof.

In U.S. Pat. Nos. 2,227,717 and 2,401,748 seats are described which comprise one or a plurality of hinge or pivot pins rigid with the seat and/or the floor, and energy absorbing means disposed between the floor or a body element, on the one hand, and the seat frame structure, on the other hand. These means are adapted to retard the seat movement when a passenger is thrown forwards in case of crash.

Another U.S. Pat. No. 2,117,932 describes seats mounted on slideways and associated with energy absorbing means adapted to retard the movement of the inertia mass of the seat and passenger along said slideways.

These known devices are relatively difficult to adjust and are further objectionable in that they prevent a proper positioning of the seat in the passengers' space. In fact, the seats thus constructed cannot slide freely along their supporting slideways.

Another inconvenience characterizing these known devices is their overall dimensions; these devices are difficult to conceal and are detrimental to the styling of the passengers' space of compartment.

For these various reasons, the use of seats equipped with energy absorption means has not become widespread so far.

It is therefore the essential object of this invention to provide a seat equipped with an energy absorption device which is easy to manufacture, has reduced overall dimensions and is capable of avoiding the inconveniences set forth hereinabove.

This seat, rigid with a first metal section movable in translation in relation to a second metal section secured to the floor of the vehicle, the first section carrying at least one transverse pivot pin for the seat. This pin lies substantially at the upper level of said movable section and is adapted to move parallel to itself in conjunction with said first section and is characterized by the fact that it is secured at at least one point to a member rigid with said movable section and provided with a zone of lesser strength and that said one point whereat the seat is secured to said member is shifted longitudinally in relation to the transverse pivot pin of the seat, and capable of performing a limited movement of rotation about said transverse pivot pin.

According to another feature of this invention the aforesaid member comprises on at least one face a pair of parallel grooves of decreasing depth disposed on either side of the seat fastening point and constituting the zone of lesser strength of said member which is adapted to be torn off along a certain length according to the magnitude of the traction effort exerted on said fastening point, by following the pivotal movement of the seat.

An exemplary form of embodiment of this seat will now be described in detail with reference to the attached drawing in which.

Figure 1:
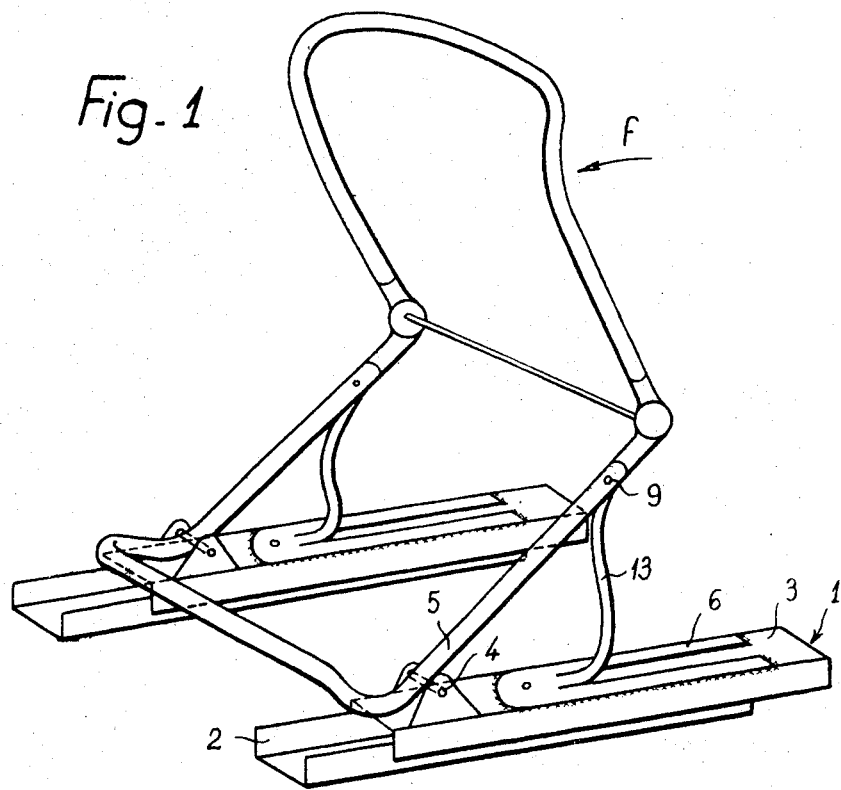
FIG. 1 is a perspective view of the device after its operation.
Figure 2:
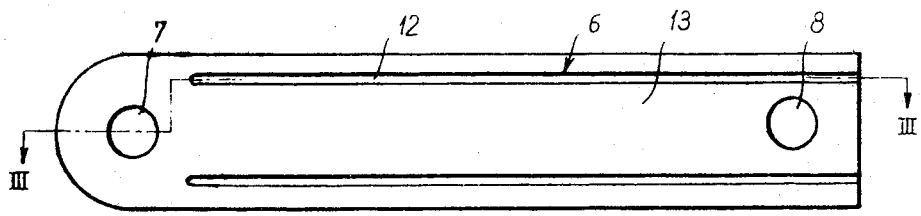
FIG. 2 is a plane view from above of the tear-off member.
Figure 3:
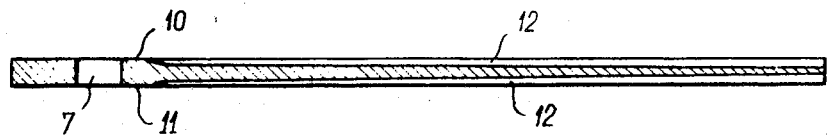
FIG. 3 is a section taken along the line III—III of FIG. 2.

In the drawing, a slideway designated in general by the reference numeral 1, consists essentially of a lower section 2 of substantially U-shaped cross-sectional contour, adapted to be secured through any suitable means to the floor (not shown) of a vehicle, and of an upper detachable section 3 carrying a pivot pin 4 rigid with the seat frame structure 5. According to this invention, a member 6 consisting substantially of a metal plate is welded to the upper movable section 3 after positioning same through any suitable means, by utilizing to this end the holes 7 and 8 formed along the longitudinal center line of this plate. The rear hole 8 may also be used for securing this plate 6 to the seat frame 5 at 9. On its opposite faces 10, 11 this plate 6 is formed with parallel grooves 12 of which the thickness decreases in the direction away from the point 9 where the member 6 is secured to the vehicle seat.

When a force is applied to the seat in the direction $f$, the seat is caused to pivot about the pivot pins 4 and the central portion 13 of member 6 is torn off along a certain length, thus causing one fraction of the kinetic energy developed during a crash to be absorbed by the device.

The member 6 may be manufactured very easily by cold die-stamping a metal sheet blank of constant or decreasing thickness, according to the desired result.

This invention is also applicable to seats adapted to tilt in one or the other direction. It is only necessary, in this case, to fasten the pivot pins 4 to the central portion 13 of member 6 and to replace the seat fastening point 9 with another pivot pin 4.

Of course, in this case two groups of grooves will converge towards the central portion of member 6 and the latter will have in this central portion the maximum thickness for limiting the movement of rotation of the seat in one or the other direction.

Of course, various modifications and variations may be brought to the forms of embodiment of the invention which are shown, described and suggested herein, without inasmuch departing from the basic principles of the invention as set forth in the appended claims.

I claim:

1. Seat for automotive vehicles or the like, comprising a first section rigid with the seat, a second section secured to the floor of the vehicle and in relation to which the first section is movable in translation, at least one transverse pivot pin of the seat lying substantially at the upper level of said first movable section and adapted to move parallel to itself in conjunction with the translation of said first section, said movable section being formed with a zone of lesser strength and said seat being secured at at least one point to said zone, this point being staggered longitudinally with respect to said pivot pin of the seat and being capable of limited rotative movement about the pivot pin when kinetic energy is absorbed by the device by deforming said zone of lesser strength, wherein said zone of lesser strength of said movable section comprises on either face at least two parallel longitudinal grooves having a thickness decreasing in the direction away from the point where the seat is secured thereto to said transverse pivot, said grooves being disposed on either side of the seat fastening point, and said zone of lesser strength being adapted to be torn off along a certain length by following the pivoting movement of the seat.

* * * * *